United States Patent
Loy-Lafond

(10) Patent No.: US 11,529,885 B2
(45) Date of Patent: Dec. 20, 2022

(54) ELECTRIC CIRCUIT FOR DISCHARGING A CAPACITOR, ELECTRIC SYSTEM AND MOTOR VEHICLE COMPRISING SUCH AN ELECTRIC DISCHARGE CIRCUIT

(71) Applicant: Valeo Equipements Electriques Moteur, Creteil (FR)

(72) Inventor: Philippe Loy-Lafond, Cergy Pontoise (FR)

(73) Assignee: Valeo Equipements Electriques Moteur, Creteil (FR)

( * ) Notice: Subject to any disclaimer, the term of this patent is extended or adjusted under 35 U.S.C. 154(b) by 519 days.

(21) Appl. No.: 16/492,230

(22) PCT Filed: Feb. 23, 2018

(86) PCT No.: PCT/FR2018/050442
§ 371 (c)(1),
(2) Date: Dec. 12, 2019

(87) PCT Pub. No.: WO2018/162819
PCT Pub. Date: Sep. 13, 2018

(65) Prior Publication Data
US 2020/0238831 A1    Jul. 30, 2020

(30) Foreign Application Priority Data

Mar. 8, 2017 (FR) ...................................... 1751861

(51) Int. Cl.
*B60L 58/00* (2019.01)
*H02J 7/00* (2006.01)
(Continued)

(52) U.S. Cl.
CPC ............. *B60L 58/00* (2019.02); *B60L 3/0046* (2013.01); *B60L 58/10* (2019.02); *H02J 7/0042* (2013.01);
(Continued)

(58) Field of Classification Search
CPC .... B60L 58/00; H02J 7/007182; H02J 7/0042
(Continued)

(56) References Cited

U.S. PATENT DOCUMENTS 6,204,612 B1    3/2001    Liu
9,470,739 B2    10/2016   Govindaraj et al.
(Continued)

FOREIGN PATENT DOCUMENTS

EP    3068022 A1    9/2016

OTHER PUBLICATIONS

International Search Report and Written Opinion issued in corresponding PCT Application No. PCT/FR2018/050442, dated May 4, 2018 (9 Pages with English Translation of International Search Report).

*Primary Examiner* — Suchin Parihar
(74) *Attorney, Agent, or Firm* — Osha Bergman Watanabe & Burton LLP

(57) ABSTRACT

The electrical discharge circuit (106) includes: —two interface terminals ($B_A$, $B_B$), to which the capacitor (C) is intended to be connected and across which a capacitor voltage ($u_C$) is intended to be present; —a current-consuming electrical circuit (108) connected between the two interface terminals ($B_A$, $B_B$) and designed to consume a discharge current (i) from the capacitor (C); and—an electrical control circuit (110) for controlling the current-consuming electrical circuit (108), the electrical control circuit (110) being connected between the two interface terminals ($B_A$, $B_B$) so as to receive the capacitor voltage ($u_C$).

The electrical control circuit (110) is designed: —to deactivate the current-consuming electrical circuit (108) when the capacitor voltage ($u_C$) is above a predefined threshold; and—to activate the current-consuming electrical circuit (108) when the capacitor voltage ($u_C$) across the two inter- (Continued)

face terminals ($B_A$, $B_B$) is below the predefined threshold. The electrical control circuit (110) is furthermore designed to be supplied with electrical power exclusively via the two interface terminals ($B_A$, $B_B$).

13 Claims, 3 Drawing Sheets

(51) Int. Cl.
    *H02J 7/34*         (2006.01)
    *B60L 58/10*       (2019.01)
    *B60L 3/00*        (2019.01)

(52) U.S. Cl.
    CPC ........ *H02J 7/007182* (2020.01); *H02J 7/345* (2013.01)

(58) Field of Classification Search
    USPC .......................................................... 320/166
    See application file for complete search history.

(56) References Cited

U.S. PATENT DOCUMENTS

| | | | |
|---|---|---|---|
| 2012/0032503 A1* | 2/2012 | Itou | B60L 15/20 307/9.1 |
| 2013/0200731 A1* | 8/2013 | Werner | B60L 3/0046 307/326 |
| 2013/0257446 A1* | 10/2013 | Soell | B60L 3/0069 324/503 |
| 2016/0020605 A1* | 1/2016 | Peach | H02H 3/048 361/118 |
| 2021/0159031 A1* | 5/2021 | Guo | H01H 9/54 |

\* cited by examiner

ELECTRIC CIRCUIT FOR DISCHARGING A CAPACITOR, ELECTRIC SYSTEM AND MOTOR VEHICLE COMPRISING SUCH AN ELECTRIC DISCHARGE CIRCUIT

TECHNICAL FIELD

The present invention relates to an electrical discharge circuit for discharging a capacitor, in particular in the field of electric motor vehicles.

TECHNOLOGICAL BACKGROUND

It is known practice to connect a resistor to the terminals of a capacitor that is supplied with power by a high-voltage source. Thus, in the event that the high-voltage source is disconnected, the capacitor is discharged into the resistor in order to prevent electric shocks that could occur if an operator were to touch the capacitor. This solution has the drawback that the passive discharge element continuously consumes current, even when this is not desired, that is to say when the high-voltage source is connected.

The US patent published under the number U.S. Pat. No. 6,204,612 B1 describes an electrical discharge circuit for discharging a capacitor, of the type including:
  two interface terminals, to which the capacitor is intended to be connected and across which a capacitor voltage is intended to be present,
  a current-consuming electrical circuit connected between the two interface terminals and designed to consume a discharge current from the capacitor, and
  an electrical control circuit for controlling the current-consuming electrical circuit, the electrical control circuit being connected between the two interface terminals so as to receive the capacitor voltage.

In this publication, the current-consuming electrical circuit is designed to be activated by the electrical control circuit in order to consume a substantially constant discharge current when the capacitor is disconnected from a power module. More specifically, the power module includes a conductor arranged so as to short a controlled switch of the electrical control circuit in order to deactivate the current-consuming circuit Thus, when the power module is disconnected, the conductor is disconnected from the electrical control circuit, causing the current-consuming electrical circuit to be activated. This solution has the drawback of requiring the presence of a mechanical element (the conductor) on the high-voltage-source side.

The object of the invention is to propose an electrical discharge circuit making it possible to at least partly overcome the above drawbacks.

SUMMARY OF THE INVENTION

To this end, an electrical discharge circuit of the abovementioned type for discharging a capacitor is proposed, said circuit being characterized in that the electrical control circuit is designed:
  to deactivate the current-consuming electrical circuit when the capacitor voltage is above a predefined threshold, and
  to activate the current-consuming electrical circuit when the capacitor voltage across the two interface terminals is below the predefined threshold,
and in that the electrical control circuit is designed to be supplied with electrical power exclusively via the two interface terminals.

By virtue of the invention, the current-consuming electrical circuit is activated when the capacitor voltage drops below a threshold, such that it is no longer necessary to provide an external mechanical element to activate the discharging of the capacitor. Furthermore, since the electrical control circuit is supplied with electrical power exclusively via the interface terminals, it is supplied with power by the capacitor when the latter is no longer connected to a power supply device. Thus, the reliability of the electrical discharge circuit is improved.

Optionally, the current-consuming electrical circuit includes a first transistor having a current input terminal, a current output terminal and a control terminal, the discharge current being intended to flow through the first transistor by entering via the current input terminal and exiting via the current output terminal, and the electrical control circuit is connected to the control terminal of the transistor and is designed both to deactivate the current-consuming electrical circuit by opening the transistor and to activate the current-consuming electrical circuit by closing the transistor.

Also optionally, the current output terminal is connected to the control terminal in order to stabilize the first transistor.

Also optionally, the current-consuming electrical circuit includes a Zener diode connected between the current output terminal and the control terminal in order to stabilize the first transistor.

Also optionally, the electrical control circuit includes: —a second transistor having a current input terminal, a current output terminal and a control terminal, the current input terminal of the second transistor being connected to the control terminal of the first transistor; and—at least one Zener diode connected between the control terminal of the second transistor and one of the two interface terminals.

An electrical system is also proposed, said system including: —a capacitor; —an electrical discharge circuit for discharging the capacitor according to the invention; —an electrical power supply device having two power supply terminals and designed to supply electrical power via the two power supply terminals; —an electrical power receiving device connected to the two interface terminals and designed to receive the electrical power supplied by the electrical power supply device.

Optionally, the electrical power supply device is designed to apply a DC supply voltage.

Also optionally, the DC supply voltage is higher than 60 V, preferably higher than 300 V.

Also optionally, a first one of the interface terminals is intended to have a higher potential than the other one of the interface terminals, and the one or more Zener diodes are connected between the control terminal of the second transistor and the first interface terminal.

Also optionally, the electrical power supply device includes one of the following: a battery charger and a battery.

Also optionally, the electrical power receiving device includes one of the following: a battery and an inverter.

Throughout the preceding text, the electrical discharge circuit for discharging the capacitor may be a passive circuit. This electrical discharge circuit may be supplied with electrical power exclusively via the two interface terminals, in particular by the capacitor that is to be discharged when the electrical power supply device is not operational. This electrical discharge circuit may moreover be devoid of any computing component, that is to say any component designed to run a computer program, such as a microcontroller or a microprocessor.

A motor vehicle including an electrical system according to the invention is also proposed.

DETAILED DESCRIPTION

Figure 1:
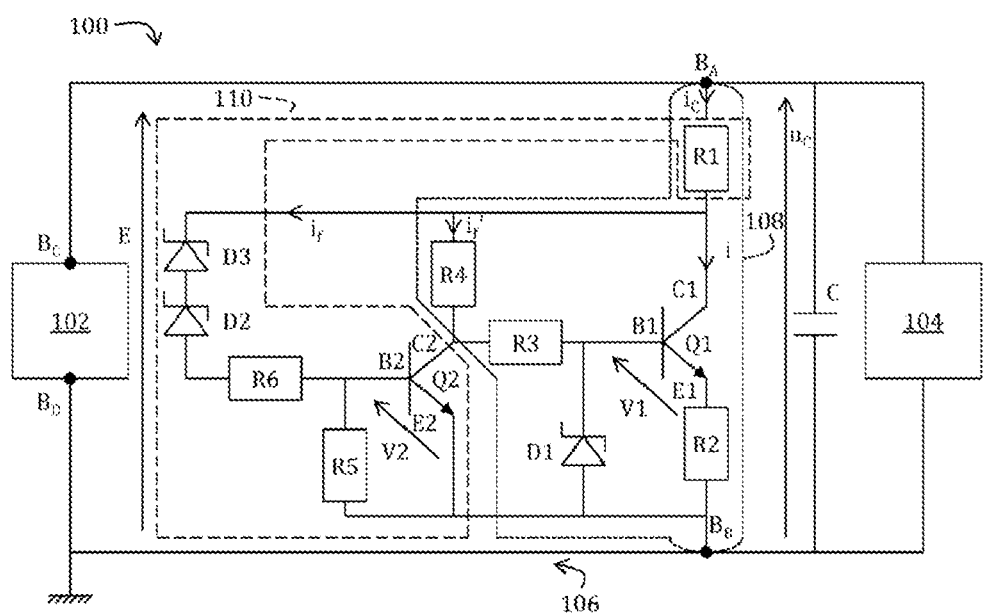
FIG. 1 is a circuit diagram of an electrical system including an electrical discharge circuit, according to the invention, for discharging a capacitor.

An electrical system 100 implementing the invention will now be described with reference to FIG. 1.

The electrical system 100 firstly includes an electrical power supply device 102 that has two electrical power supply terminals $B_C$, $B_D$. The electrical power supply device 102 is designed to supply electrical power via the two electrical power supply terminals $B_C$, $B_D$ by applying a supply voltage E across them. For example, the supply voltage E is substantially constant. Furthermore, in the example described, the terminal $B_D$ is connected to an electrical ground of the electrical system 100, and the terminal $B_C$ is intended to be at a positive potential of +E V with respect to the terminal $B_D$.

The electrical system 100 furthermore includes an electrical power receiving device 104 connected between the electrical power supply terminals $B_C$, $B_D$ and designed to receive the electrical power supplied by the electrical power supply device 102.

The electrical system 100 furthermore includes a capacitor C connected between the electrical power supply terminals $B_C$, $B_D$ and designed for example to smooth the supply voltage E. Across its terminals, the capacitor C has a capacitor voltage $u_C$ which is equal to the supply voltage E when the electrical power supply device 102 is operational.

The electrical system 100 furthermore includes an electrical discharge circuit 106 for discharging the capacitor C, intended in particular to discharge the capacitor C when the electrical power supply device 102 is not operational, for example when it is disconnected.

The electrical discharge circuit 106 firstly includes two interface terminals $B_A$, $B_B$ connected to the terminals of the capacitor C so as to receive the capacitor voltage $u_C$.

The electrical discharge circuit 106 furthermore includes a current-consuming electrical circuit 108 connected between the interface terminals $B_A$, $B_B$.

In the example described, the current-consuming electrical circuit 108 includes a transistor Q1 which has a current input terminal C1, a current output terminal E1 and a control terminal B1. In the example described, the transistor Q1 is a bipolar transistor which has a collector, an emitter and a base corresponding to the current input terminal C1, the current output terminal E1 and the control terminal B1, respectively. The open or closed state of the transistor Q1 is defined by a control voltage V1 that is present between the control terminal B1 and the current output terminal E1.

In the example described, the current-consuming electrical circuit 108 furthermore includes a resistor R1 connected between the current input terminal C1 and the interface terminal $B_A$.

In the example described, the current-consuming electrical circuit 108 furthermore includes a resistor R2 connected between the current output terminal E1 and the interface terminal $B_B$.

In the example described, the current-consuming electrical circuit 108 furthermore includes two resistors R3, R4 connected in series with one another between the control terminal B1 and the current input terminal C1.

In the example described, the current-consuming electrical circuit 108 furthermore includes a Zener diode D1 connected between the control terminal B1 and the interface terminal B, so as to stabilize the transistor Q1.

The electrical discharge circuit 106 furthermore includes an electrical control circuit 110 for controlling the current-consuming electrical circuit 108.

The electrical control circuit 110 is connected between the two interface terminals $B_A$, $B_B$.

In the example described, the electrical control circuit 110 includes a transistor Q2 which has a current input terminal C2, a current output terminal E2 and a control terminal B2. In the example described, the transistor Q2 is a bipolar transistor which has a collector, an emitter and a base corresponding to the current input terminal C2, the current output terminal E2 and the control terminal B2, respectively. The open or closed state of the transistor Q2 is defined by a control voltage V2 between the control terminal B2 and the current output terminal E2.

In the example described, the current output terminal E2 is connected to the interface terminal $B_B$.

In the example described, the electrical control circuit 110 furthermore includes a resistor R5 connected between the control terminal B2 and the current output terminal E2. The connection between the control terminal B2 and the current output terminal E2 via the resistor R5 also makes it possible to stabilize the transistor Q2.

In the example described, the electrical control circuit 110 furthermore includes a resistor R6 and at least one Zener diode D3, D2, which are connected in series with one another between the control terminal B2 and the control terminal C1. The Zener diodes D3, D2 have a combined breakdown voltage that is equal to the sum of the individual breakdown voltages of the Zener diodes D3, D2.

In the example described, the electrical control circuit 110 furthermore includes the resistor R1. Thus, the electrical control circuit 110 receives the capacitor voltage $u_C$ which is applied in particular across the terminals of the resistor R1, of the Zener diodes D3, D2 and of the resistors R5 and R6.

Moreover, at least one of the resistors R1, R2, R3, R4, R5 and R6 is preferably a resistor having a resistance that varies little with temperature, for example varying at most by 100 millionths of an ohm per degree Celsius between 0° C. and 150° C.

Figure 2:
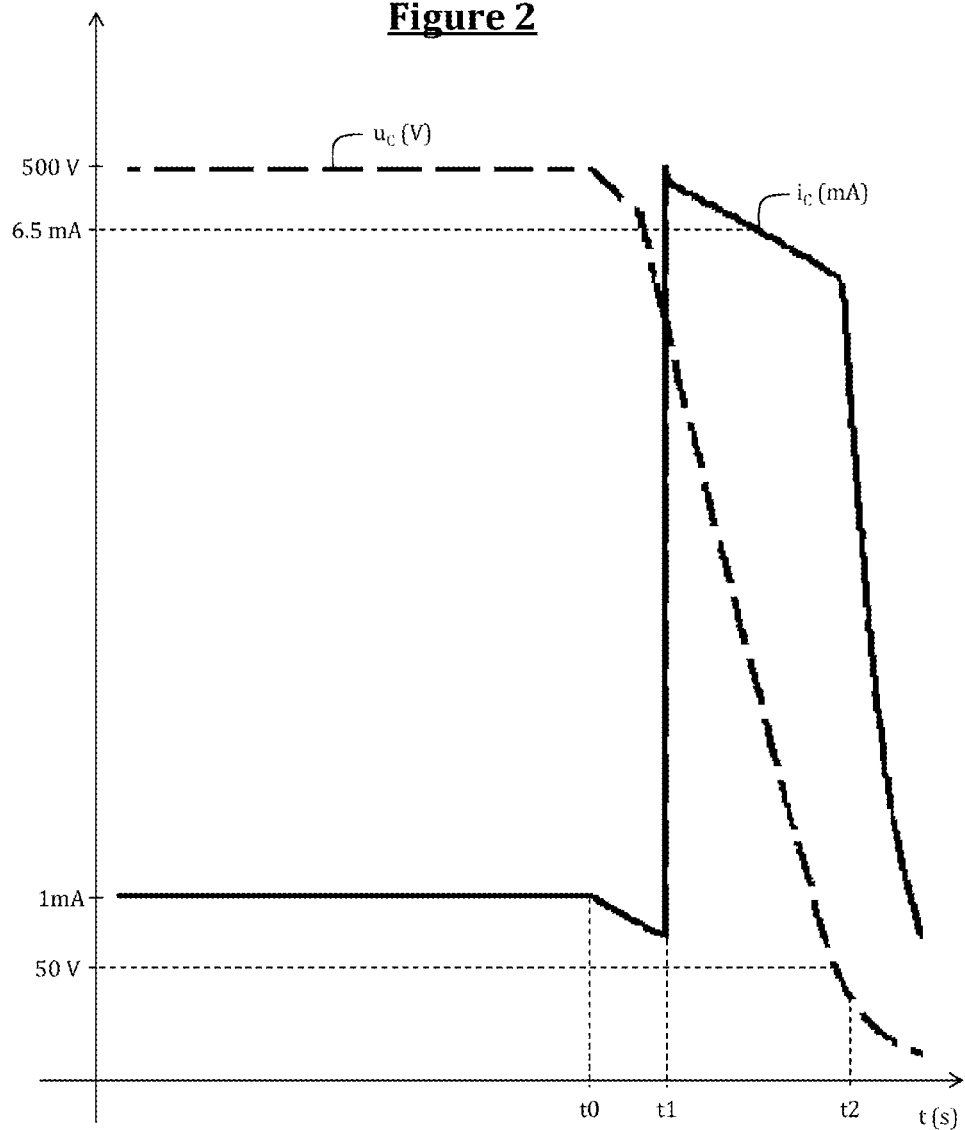
FIG. 2 is a timing diagram illustrating the change with time in a capacitor voltage and in a current entering the electrical discharge circuit.

The operation of the electrical system 100 will now be described with reference to FIG. 2.

Initially, the electrical power supply device 102 is operational and applies the supply voltage E, which has the value of 500 V in the example described, across its electrical power supply terminals $B_C$, $B_D$. Generally, the supply voltage E is a "high voltage", which means, in the automotive field, that it has a value greater than 60 V, preferably greater than 300 V.

Thus, the capacitor C is charged at the supply voltage E such that the capacitor voltage $u_C$ is equal to the supply voltage E.

This capacitor voltage $u_C$ is received by the electrical control circuit 110, such that the voltage across the terminals of the resistor R1, of the Zener diodes D3, D2 and of the resistors R5, R6 is equal to the supply voltage E.

Now, the combined breakdown voltage of the Zener diodes D3, D2 is selected to be lower than the supply voltage E, such that the Zener diodes D3, D2 allow a first leakage current if to flow through, said leakage current flowing from the terminal $B_A$ to the terminal $B_B$, passing through the resistors R1, R6 and R5.

As a result of the leakage current if flowing through the resistor R5, the control voltage V2 is non-zero, such that the transistor Q2 is kept in the closed (on) state.

The transistor Q2 therefore shorts the resistor R3 and the Zener diode D1, such that the control voltage V1 is substantially zero.

Thus, the transistor Q1 is kept in the open (off) state, such that the current-consuming electrical circuit 108 is deactivated and the discharge current i is substantially zero.

Moreover, since the transistor Q2 is closed (on), a second leakage current $i_f'$ flows from the interface terminal A to the interface terminal B, passing through the resistor R4.

Thus, the current is entering via the interface terminal $B_A$ is equal to the sum of the leakage currents $i_f$, $i_f'$.

At a time t0, the electrical power supply device 102 transitions to the non-operational state, for example by being disconnected from the rest of the electrical system 100.

Thus, the capacitor C is discharged both into the resistors R1, R5 and R6 and the Zener diodes D3, D2 and also into the resistor R4, such that the capacitor voltage $u_C$ decreases.

By virtue of the transistor Q2 being stabilized, the leakage current $i_f'$ is substantially constant (slightly decreasing, in fact), which enables the capacitor C to be discharged quite rapidly.

At a time t1, the voltage $u_C$ becomes equal to the combined breakdown voltage of the Zener diodes D3, D2, which therefore transition to the off state.

Thus, the leakage current if flowing through the resistor R5 becomes zero, such that the control voltage V2 becomes zero and the transistor Q2 transitions to the open (off) state.

Thus, the control terminal B1 receives the leakage current $i_f'$ via the resistors R1, R4 and R3, and the control voltage V1 becomes non-zero. The transistor Q1 therefore transitions to the closed (on) state, such that the current-consuming electrical circuit 108 is activated and a non-zero discharge current i flows from the terminal $B_A$ to the terminal $B_B$ via the transistor Q1. The discharge current i is much greater than the leakage current $i_f'$, such that the current is entering via the interface terminal $B_A$ is substantially equal to the discharge current i.

Moreover, since the transistor Q1 is stabilized, the discharge current i flowing through it is substantially constant (slightly decreasing, in fact), at a distinctly higher level than the leakage current if', between the time t0 and the time t1, which enables the capacitor C to be discharged very rapidly. Preferably, the components are chosen such that the capacitor C is discharged to below 60 V in less than 60 s (time t2 in FIG. 2).

In accordance with the foregoing, the electrical discharge circuit 106, and therefore each one of the current-consuming electrical circuit 108 and of the electrical control circuit 110, is a passive circuit, which means both that it is designed to be supplied with electrical power exclusively via the two terminals $B_A$, $B_B$, in particular by the capacitor C when the electrical power supply device 102 is not operational and that it does not include any computing component, that is to say any component designed to run a computer program, such as a microcontroller or a microprocessor.

Figure 3:
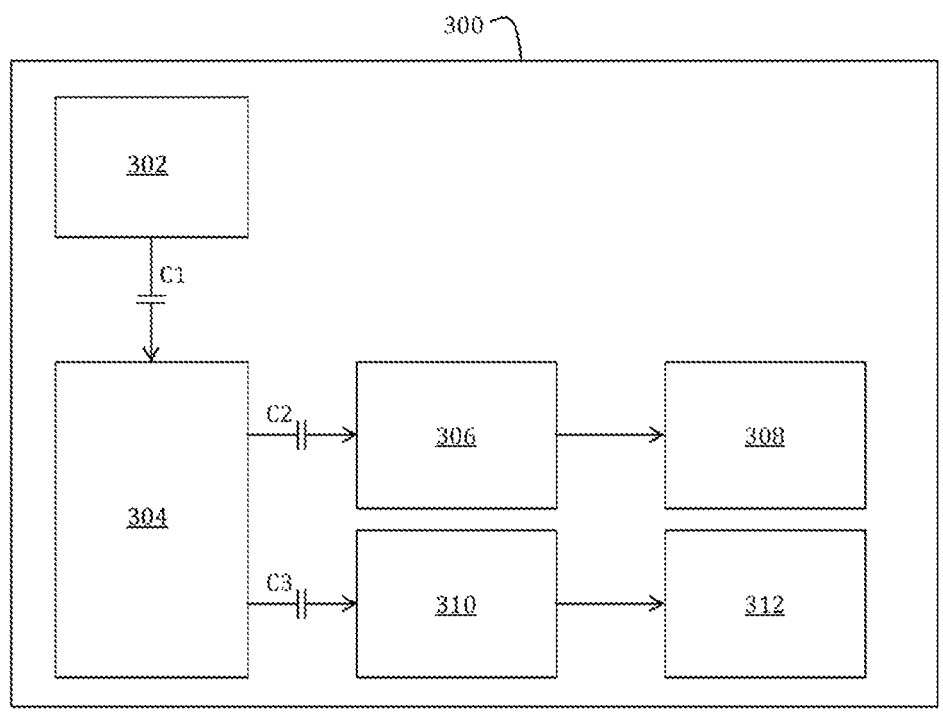
FIG. 3 is a diagram illustrating a motor vehicle including at least one electrical discharge circuit such as illustrated in FIG. 1.

An electric motor vehicle 300 will now be described with reference to FIG. 3.

The electric motor vehicle 300 includes a charger 302 designed to be connected to an electrical network and to supply a DC voltage.

The electric motor vehicle 300 furthermore includes a high-voltage battery 304 designed to be charged by the charger 302.

The electric motor vehicle 300 furthermore includes a capacitor C1 inserted between the charger 302 and the high-voltage battery 304.

The electric motor vehicle 300 furthermore includes an inverter 306 designed to supply AC voltages on the basis of the DC voltage from the high-voltage battery 304.

The electric motor vehicle 300 furthermore includes a capacitor C2 inserted between the high-voltage battery 304 and the inverter 306.

The electric motor vehicle 300 furthermore includes an electric motor 308 designed to be supplied with electrical power by the inverter 306 and to drive wheels of the electric motor vehicle 300.

The electric motor vehicle 300 furthermore includes a DC-to-DC converter 310 designed to supply a low voltage on the basis of the high voltage supplied by the high-voltage battery 304.

The electric motor vehicle 300 furthermore includes a capacitor C3 inserted between the high-voltage battery 304 and the DC-to-DC converter 310.

The electric motor vehicle 300 furthermore includes a low-voltage battery 312 designed to be charged by the DC-to-DC converter 310. The low-voltage battery 312 serves for example to supply electrical power to accessories of the electric motor vehicle 300.

The electrical discharge circuit 106 described with reference to FIG. 2 may be used for each of the capacitors C1, C2, C3. Thus, depending on the capacitor concerned, the electrical power supply device 102 thus includes one of the following: the charger 302 and the high-voltage battery 304, and the electrical power receiving device includes one of the following: the high-voltage battery 304, the inverter 306 and the DC-to-DC converter 310.

The present invention is not limited to the embodiment described above, but rather is defined by the claims below. Indeed, it will be obvious to a person skilled in the art that it can be modified.

For example, one or other of the resistors R1 and R2 could be omitted.

Moreover, the terms used in the claims should not be understood as being limited to the elements of the embodiment described above, but rather should be understood as covering all equivalent elements that a person skilled in the art is able to infer from his or her general knowledge.

In particular, the term "electric motor vehicle" also covers the case of hybrid motor vehicles including both an electric motor and a combustion engine for driving the wheels.

The invention claimed is:

1. An electrical discharge circuit for discharging a capacitor, including:
   two interface terminals, to which the capacitor is configured to be connected and across which a capacitor voltage is present,
   a current-consuming electrical circuit connected between the two interface terminals and configured to consume a discharge current from the capacitor; and
   an electrical control circuit for controlling the current-consuming electrical circuit, the electrical control circuit being connected between the two interface terminals so as to receive the capacitor voltage, wherein the electrical control circuit is configured to:
deactivate the current-consuming electrical circuit when the capacitor voltage is above a predefined threshold, and
activate the current-consuming electrical circuit when the capacitor voltage across the two interface terminals is below the predefined threshold,
wherein the electrical control circuit is configured to be supplied with electrical power exclusively via the two interface terminals.

2. The electrical discharge circuit as claimed in claim 1, wherein the current-consuming electrical circuit comprises:
a first transistor having a current input terminal, a current output terminal and a control terminal, the discharge current being configured to flow through the first transistor by entering via the current input terminal and exiting via the current output terminal, and wherein the electrical control circuit is connected to the control terminal of the transistor and is configured both to deactivate the current-consuming electrical circuit by opening the transistor and to activate the current-consuming electrical circuit by closing the transistor.

3. The electrical discharge circuit as claimed in claim 2, wherein the current output terminal is connected to the control terminal to stabilize the first transistor.

4. The electrical discharge circuit as claimed in claim 3, wherein the current-consuming electrical circuit includes a Zener diode connected between the current output terminal and the control terminal to stabilize the first transistor.

5. The electrical discharge circuit as claimed in claim 2, wherein the electrical control circuit comprises:
a second transistor having a current input terminal, a current output terminal and a control terminal, the current input terminal of the second transistor being connected to the control terminal of the first transistor, and
at least one Zener diode connected between the control terminal of the second transistor and one of the two interface terminals.

6. The electrical discharge circuit as claimed in claim 1, said circuit being a passive circuit.

7. An electrical system including:
a capacitor;
an electrical discharge circuit for discharging the capacitor as claimed in claim 1;
an electrical power supply device having two power supply terminals for supplying electrical power via the two power supply terminals; and
an electrical power receiving device connected to the two interface terminals and configured to receive the electrical power supplied by the electrical power supply device.

8. The electrical system as claimed in claim 7, wherein the electrical power supply device applies a DC supply voltage.

9. The electrical system as claimed in claim 8, wherein the DC supply voltage is higher than 300 V.

10. The electrical system as claimed in claim 8, wherein a first one of the interface terminals is configured to have a higher potential than the other one of the interface terminals, and wherein the one or more Zener diodes are connected between the control terminal of the second transistor and the first interface terminal.

11. The electrical system as claimed in claim 7, wherein the electrical power supply device comprises one selected from the group consisting of: a battery charger and a battery.

12. The electrical system as claimed in claim 7, wherein the electrical power receiving device comprises one selected from the group consisting of: a battery and an inverter.

13. A motor vehicle including an electrical system as claimed in claim 7.

* * * * *